United States Patent [19]

McFadden et al.

[11] Patent Number: 4,860,976
[45] Date of Patent: Aug. 29, 1989

[54] ATTACHED JET SPANWISE BLOWING LIFT AUGMENTATION SYSTEM

[75] Inventors: Russell E. McFadden, Andale; Charles H. Shure, III, Haysville, both of Kans.

[73] Assignee: The Boeing Company, Seattle, Wash.

[21] Appl. No.: 104,385

[22] Filed: Oct. 5, 1987

[51] Int. Cl.⁴ .............................................. B64C 21/04
[52] U.S. Cl. .................................. 244/207; 244/199; 244/204
[58] Field of Search ........................ 244/199, 204, 207

[56] References Cited

U.S. PATENT DOCUMENTS

| | | | |
|---|---|---|---|
| 1,496,373 | 6/1924 | Hunt | 244/207 |
| 2,974,904 | 3/1961 | Fielding et al. | 244/207 |
| 3,480,234 | 11/1969 | Cornish, III | 244/199 |
| 3,596,854 | 8/1971 | Haney, Jr. | 244/199 |
| 3,881,669 | 5/1975 | Lessen | 244/207 |
| 4,648,571 | 3/1987 | Gerhardt | |
| 4,560,121 | 12/1985 | Terp | |
| 3,921,942 | 11/1975 | Bracka | |
| 3,604,661 | 9/1971 | Mayer Jr. | |
| 3,018,987 | 1/1962 | Multhopp | |
| 2,484,359 | 10/1949 | Tipton | |
| 2,334,070 | 11/1943 | Conley | |

Primary Examiner—Joseph F. Peters, Jr.
Assistant Examiner—Rodney Corl
Attorney, Agent, or Firm—Finnegan, Henderson, Farabow, Garrett & Dunner

[57] ABSTRACT

A lift enhancing system for an aircraft having wings and a deflectable airfoil attached to the trailing edge of the wing which includes ejecting nozzles attached to and movable with each deflectable airfoil to eject gas spanwise across the surface of the deflectable airfoil and thereby enhance the lift of the wing and deflectable airfoil.

5 Claims, 6 Drawing Sheets

ATTACHED JET SPANWISE BLOWING LIFT AUGMENTATION SYSTEM

BACKGROUND OF THE INVENTION

1. Field of the Invention

The present invention relates to spanwise blowing along a deflectable airfoil surface of an aircraft, and in particular to spanwise blowing a jet of air across a deflectable airfoil surface through a nozzle which is attached to and moves with the airfoil.

2. Description of the Related Art

Numerous methods and systems for increasing aerodynamic lift by blowing air over airfoil surfaces have been suggested and tested in the past. Such systems for enhancing aerodynamic lift may be broadly categorized in terms of the direction of air flow over the airfoil surfaces. The first broad category would include blowing compressed air in the same direction as the free stream air flow over the airfoil surface. Such blowing is hereinafter termed chordwise blowing. The second broad category would include blowing compressed air in a direction substantially tangential to the lifting or airfoil surface and perpendicular to the freestream airflow. Such blowing is hereinafter termed spanwise blowing along the airfoil surface. The present invention falls into the latter category of spanwise blowing, and further discussion is limited to the same.

The broad category of spanwise blowing across airfoil surfaces is normally addressed in one of two subcategories. The first involves spanwise blowing along the leading edge of the airfoil surface. An example of a study typical of such leading edge spanwise blowimg is presented in an article entitled "An Experimental Investigation of Leading Edge Spanwise Blowing," International Council of Aeronautic Sciences, ICAS-82-6.6.2, Beijing Institute of Aeronautics and Astronautics, Su Wenhan et al. Such leading edge spanwise blowing is generally directed to creating a more stable leading edge vortex above the wing or airfoil surface.

Figure 3:
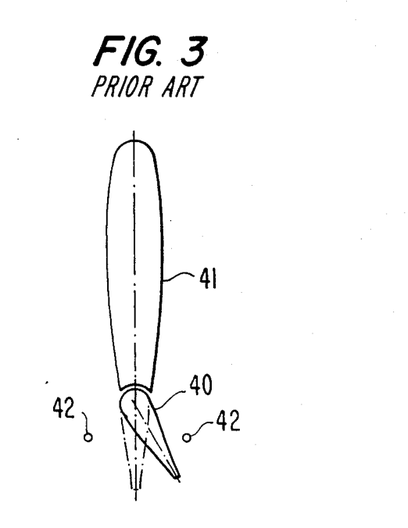
FIG. 3 is a sectional view of an aircraft wing having a deflectable airfoil with trailing edge spanwise blowing nozzles configured according to the prior art.

The second subcategory of spanwise blowing involves spanwise blowing near the hinge line of a control surface or trailing edge flap for the purpose of providing boundary layer control to prevent flow separation behind the wing and control surface. A typical example of a study directed to such trailing edge spanwise blowing is provided in the article "Effects of Spanwise Blowing and Reverse Thrust on Fighter Low Speed Aerodynamics," Journal of Aircraft, Volume 20, No. 2, Feb. 1983, by J. W. Paulson, Jr., et al. FIG. 3 illustrates a typical example of a prior art trailing edge spanwise blowing configuration. In FIG. 3 an airfoil flap or rudder 40 is deflectably fixed to a wing 41. Nozzles 42 are typically mounted in the aft section of the fuselage of the aircraft and are stationary with respect to flap 40. Air is ejected from the nozzles spanwise along the surfaces of flap 40.

The present invention is directed to the broad category of trailing edge spanwise blowing across control surfaces or flaps of an aircraft and distinguishes itself from prior art systems by the location of the nozzle which directs the air flow spanwise along the airfoil or flap surface.

It is an object of the present invention to provide an enhanced lift augmentation system for an aircraft utilizing spanwise blowing across the trailing edge control surfaces of the aircraft wherein the exit nozzle which direct the spanwise jet of air along the control surface is attached to and is movable with the control surface as it is deflected.

Additional objects and advantages of the invention will be set forth in the description which follows, and in part will be obvious from the description, or may be learned by practice of the invention. The objects and advantages of the invention may be realized and attained by means of the instrumentalities and combinations particularly pointd out in the appended claims.

SUMMARY OF THE INVENTION

To achieve the foregoing objects, and in accordance with the purposes of the invention as embodied and broadly described herein, there is provided an improved lift enhancing system for an aircraft having wings and deflectable airfoils attached to the trailing edge of each wing, comprising: nozzle means, connected to and movable with the deflectable airfoils, for directing fluid at a predetermined volumetric flow rate spanwise along at least one surface of the deflectable airfoil to reduce the separated flow area, behind the deflectable airfoil, of air moving chordwise across the wing and deflectable airfoil to thereby enhance the lifting capability of the wings and deflectable airfoil. The system further includes means for supplying fluid to the nozzle means to effect the volumetric flow rate.

It is preferable that the nozzle means provide a predetermined volumetric flow rate spanwise along both the upper and lower surfaces of the airfoil.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

In accordance with the present invention there is provided a lift enhancing system for an aircraft having wings and at least one deflectable airfoil attached to the trailing edge of each wing, comprising nozzle means connected to and movable with the airfoil for directing fluid at a predetermined volumetric flow rate spanwise along at least one surface of the airfoil to reduce the separated flow area, behind the wing and deflectable airfoil, of air moving chordwise across the wing and deflectable airfoil to thereby enhance the lifting capability of the wing and deflectable airfoil.

Figure 1:
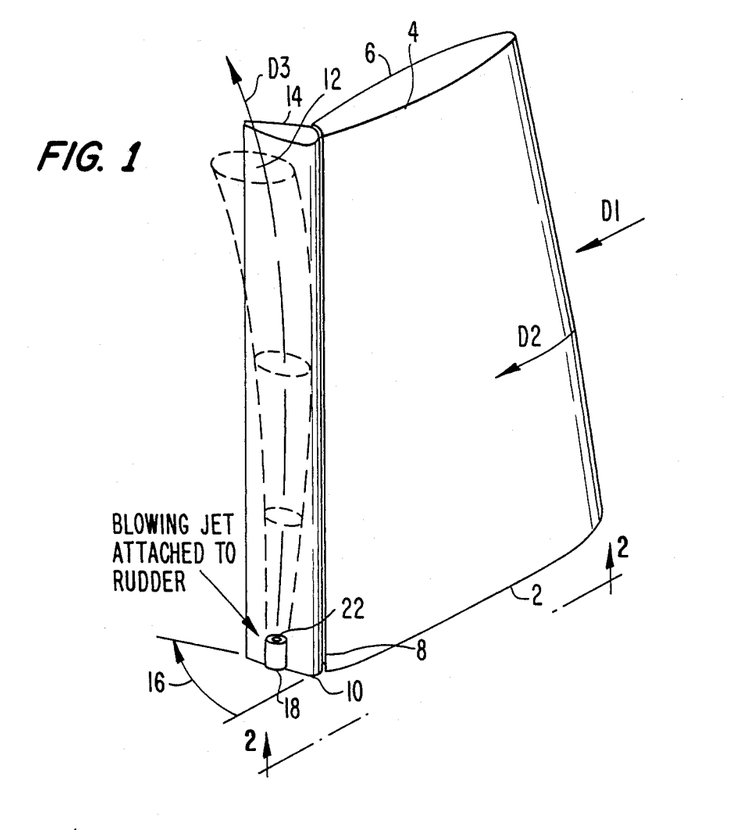
FIG. 1 is a perspective view of a portion of an aircraft wing having a deflectable airfoil attached at the trailing edge of the wing with a nozzle attached to and movable with the deflectable airfoil.
Figures 4, 5:
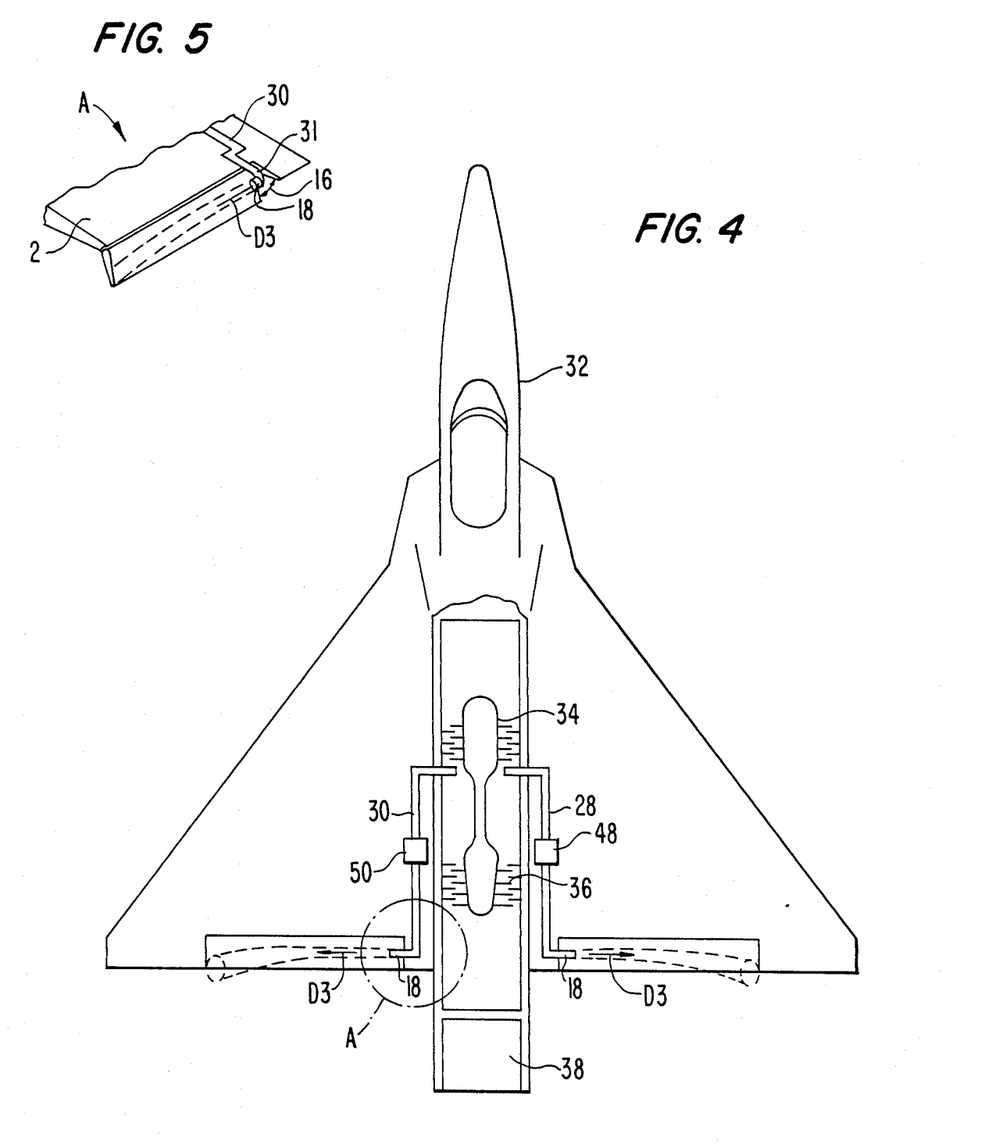
FIG. 4 is a top view of an aircraft having nozzles attached to and movable with deflectable airfoils on the trailing edge of the wings of the aircraft according to the present invention.
FIG. 5 is a detailed view taken at location A in FIG. 4 showing a deflectable airfoil having nozzles attached to and movable with the deflectable airfoil according to the present invention.

With reference to FIG. 4 which indicates a top view of an aircraft incorporating the present invention, and FIG. 1 which illustrates a perspective view of a portion of an aircraft wing and deflectable airfoil incorporating the present invention, D1 represents the direction of free air flow across a wing 2. Wing 2 includes an upper surface 4 and a lower surface 6 and a trailiing edge 8. Attached to the wing 2 at the trailing edge 8 is a deflectable airfoil 10 having an upper surface 12 and a lower surface 14. Airfoil 10 is deflectable with respect to the trailing edge 8. The deflection angle of the deflectable airfoil is represented by 16 in FIG. 1.

With continued reference to FIG. 1 and as embodied herein, the nozzle means includes a first nozzle 18 having an exit port 22. Nozzle 18 is attached to and movable with deflectable airfoil 10 and directs fluid at a predetermined volumetric flow rate in spanwise direction D3 along upper surface 12 of airfoil 10. Exit port 22 of nozzle 18 may be configured to direct fluid exiting therefrom in a spanwise direction D3 which is substantially parallel to trailing edge 8 of wing 2. Alternatively, exit port 22 may be configured to direct air spanwise along upper surface 12 of deflectable airfoil 10 at any predetermined angle relative to the trailing edge 8 of wing 2.

Figure 2:
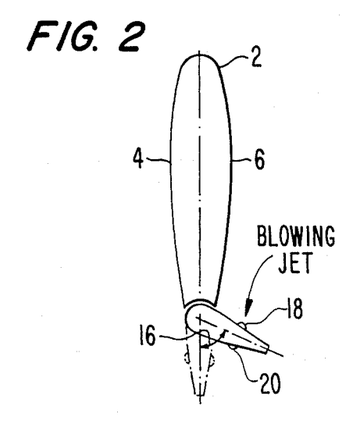
FIG. 2 is a sectional view taken along the line 2—2 of FIG. 1 showing a cross section of an aircraft wing having a deflectable airfoil with nozzles attached to and movable with the deflectable airfoil.

With reference to FIG. 2, the nozzle means may also include a second nozzle 20 attached to and movable with deflectable airfoil 10 and configured to direct air exiting therefrom in spanwise direction D3 along lower surface 14 of deflectable airfoil 10. In either embodiment, that is, a single nozzle for directing air in a spanwise direction along the upper surface 12 of deflectable airfoil 10, or dual nozzles configured to direct air in a spanwise direction along both the upper and lower surfaces 12 and 14 of deflectable airfoil 10, the nozzle is attached to and movable with deflectable airfoil 10 and provides enhanced lifting capability to the wing and deflectable airfoil by reducing the separated flow area, behind the wing and deflectable airfoil, of air moving chordwise across the surfaces of the wing and deflectable airfoil.

With continued reference to FIG. 4, the present invention further includes means for supplying fluid to the nozzle means to effect the volumetric flow rate through the nozzles. As embodied herein, the supplying means includes compressor 34 and conduits 28 and 30. Compressor 34, by way of example and not limitation, may be the gas turbine engine compressor powered by hot products of combustion expanding through turbine blades 36, or, alternatively, may be any other source of compressed air on the aircraft. In a still further embodiment of the supplying means, conduits 30 and 28 may be directly connected to the exhaust of the gas turbine engine to supply hot exhaust gases to nozzles 18 and 20.

With reference to FIG. 5 which illustrates a detailed view of the connection of conduit 30 to nozzle 18 as shown in FIG. 4, conduit 30 may be positioned within wing 2 to extend through the wing and through the deflectable airfoil 10 terminating at nozzle 18 through a flexible portion 31. Flexible portion 31 of conduit 30 is provided to accommodate movement of deflectable airfoil 10 relative to the trailing edge 8 of the aircraft wing 2. Numerous other types of connections of conduit 30 to nozzle 18 will be readily apparent to those skilled in the art which would accommodate or allow for the deflection and relative movement of deflectable airfoil 10 and nozzle 18.

Figure 11:
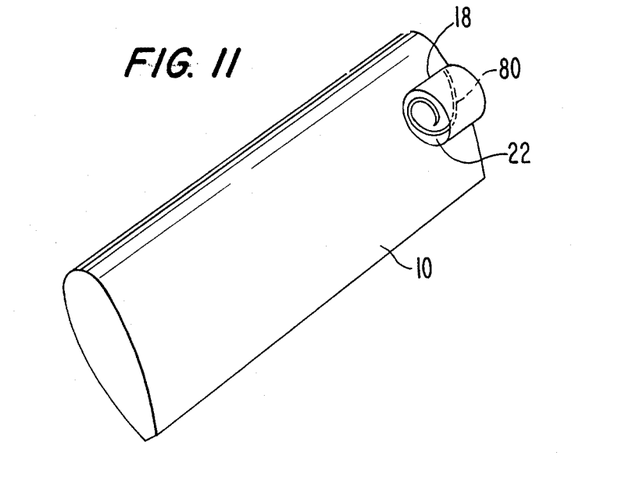
FIG. 11 is a detail view of a nozzle used with the teachings of the present invention which illustrates swirl vanes positioned in the nozzle exit to impart a swirling flow to the air exiting from the nozzle.

The nozzle means, which in the preferred embodiment described herein, is comprised of nozzle 18 having an exit port 22, may also include a means for imparting a swirling flow to the fluid being directed from the nozzle means. By way of example and not limitation and as illustrated in FIG. 11, the means for imparting a swirling flow to the fluid directed from the nozzle means includes swirl vanes 80 configured as a helical coil positioned in exit port 22 of nozzle 18 as shown in FIG. 11. Numerous other means for imparting a swirling flow to the fluid being directed from the nozzle will be readily apparent to those skilled in the art. For instance, exit port 22 of nozzle 18 may include tangential inlet ports through which the fluid is fed into the nozzle so as to impart a swirling motion to the fluid exiting from the nozzle.

With continued reference to FIG. 4, conduits 30 and 28, which in the preferred embodiment comprise part of the means of supplying fluid to the nozzle means, may be further configured with in-line control valves 48 and 50 for regulating the flow of compressed air or other fluid from the compressed air source to the nozzles. In this manner the predetermined volumetric flow rate of fluid exiting from the nozzle means may be directly controlled or regulated. Alternatively, the nozzle may be configured as a control orifice permitting passage of the predetermined volumetric flow at a design supply pressure value.

Figure 6:
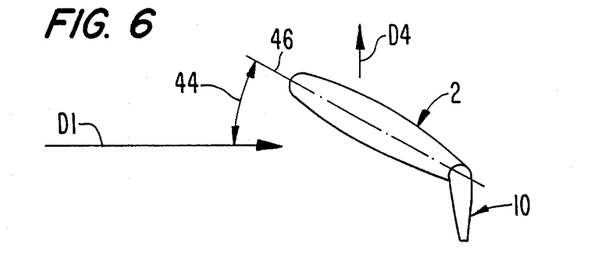
FIG. 6 is a sectional view of a wing having a deflectable airfoil attached at the trailing edge of the wing and is provided to illustrate reference coordinate directions used in describing the advantages and enhanced performance of a deflectable airfoil incorporating the present invention.

The inventors have conducted numerous wind tunnel tests to verify the improved lifting capability of a wing and deflectable airfoil incorporating the teachings of the present invention. FIG. 6 provides a schematic depiction of the reference coordinate system utilized in reporting the results of these wind tunnel tests. With reference to FIG. 6, aircraft wing 2 having a deflectable airfoil 10 attached at the trailing edge of the wing has a reference chord plane 46. D1 represents the direction of free air flow and D4 represents the direction of lift on wing 2. 44 presents the angle of attack of the aircraft and is defined as the angular difference between the direction of free air flow D1 and reference chord plane 46 of wing 2.

Figure 7:
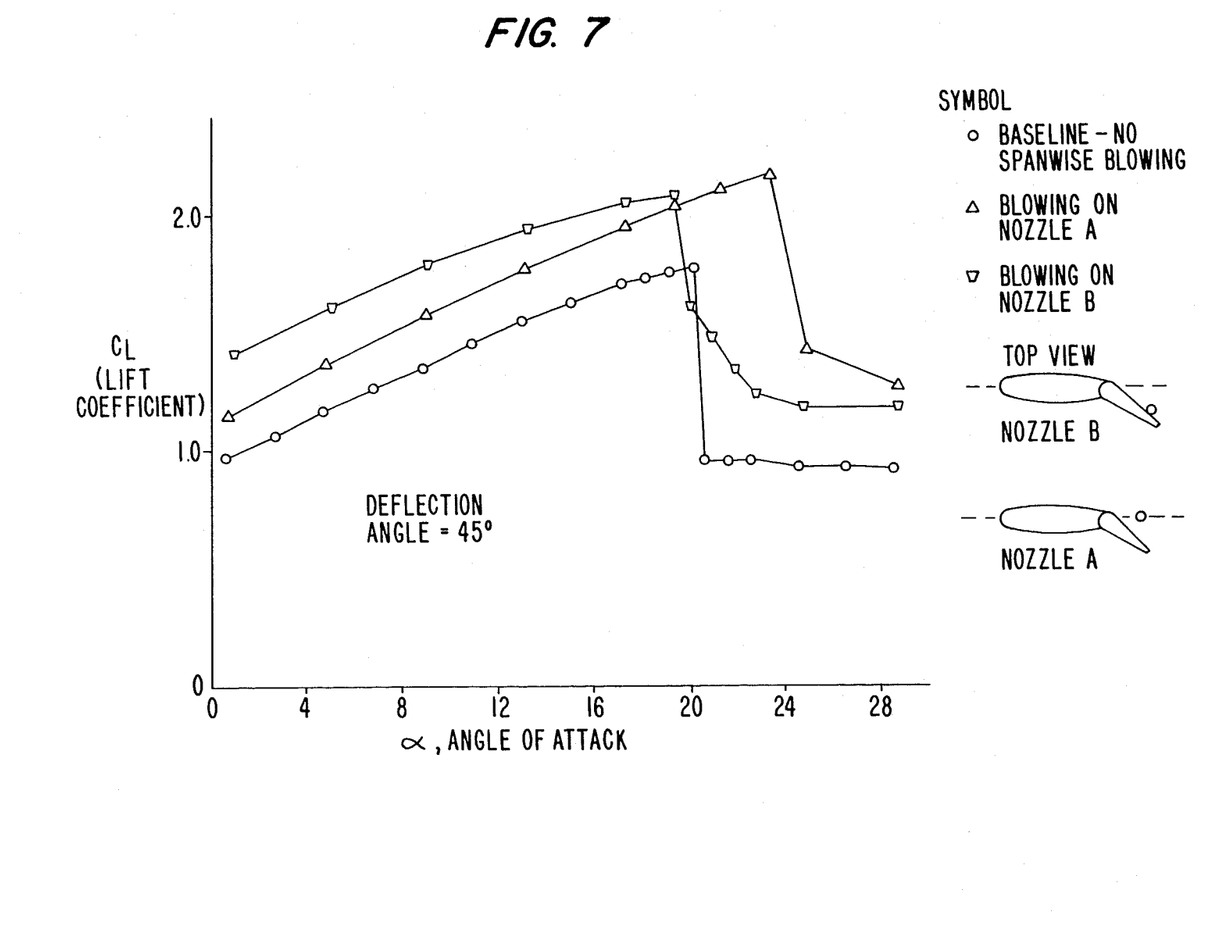
FIG. 7 is a graph correlating the lift coefficient with angle of attack for prior art trailing edge spanwise blowing configurations and a trailing edge spanwise blowing configuration incorporating the teachings of the present invention.

With reference to FIG. 7, there is shown a graph correlating the lift coefficient, which is directly proportional to the amount of lift that the wing 2 and deflectable airfoil 10 are producing, for various angles of attacks. FIG. 7 provides results for a deflection angle 16 equal to 45°. Other deflection angles tested produced the same trend as indicated in the graph of FIG. 7. FIG. 7 illustrates three plots beginning with a deflectable airfoil having no spanwise blowing, a deflectable airfoil having prior art stationary spanwise blowing nozzles and labeled nozzle A, and a final plot for a deflectable airfoil incorporating the present invention and labeled nozzle B. As is apparent from the plot of FIG. 7, the present invention provides an enhanced lift coefficient over prior art trailing edge spanwise blowing configurations thorugh at least a 19° angle of attack.

Figure 8A:
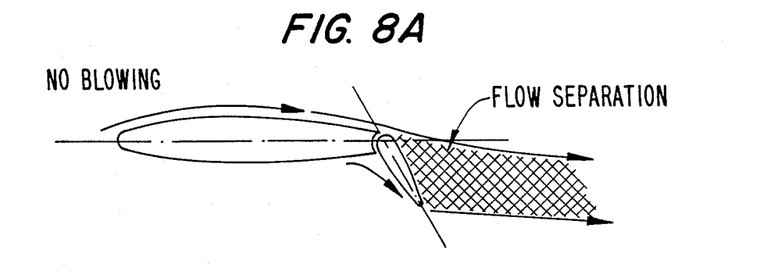
FIG. 8A is a cross-sectional view of a wing having a deflectable airfoil with no spanwise blowing and illustrates the flow separation behind the wing and deflectable airfoil.
Figure 8B:
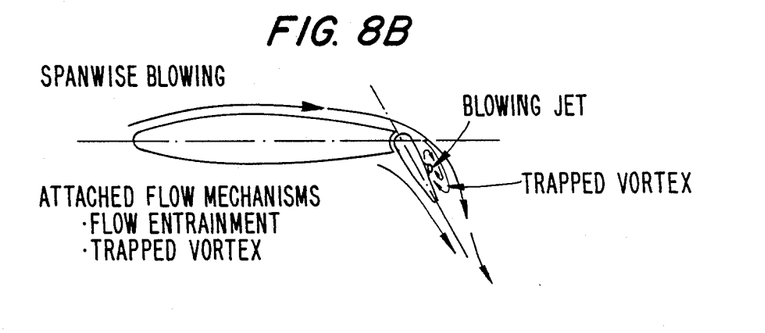
FIG. 8B is a cross sectional view of a wing having a deflectable airfoil attached to the trailing edge and which illustrates the trapped vortex and flow entrainment on the deflectable airfoil as a result of a trailing edge spanwise blowing configuration in accordance with the present invention.

The flow mechanisms of spanwise blowing lift enhancement for a wing and deflected airfoil are flow entrainment and vortex entrapment. As illustrated in FIGS. 8A and 8B, behind a deflected airfoil there exists a large separated wake at large deflection angles of the airfoil. This wake is characterized by low vorticity and high velocity air.

As illustrated in FIG. 8B showing a wing and deflectable airfoil incorporating the teachings of the present invention, spanwise blowing of a high velocity jet of air into a low velocity region results in a jet entrainment of the low velocity air out of the separated wake. In addition, a vortex is induced by the jet and becomes trapped along the deflected airfoil surface. This results in a thinning of the separated wake behind the airfoil, flow reattachment of the air to the airfoil surface, and increased pressure differential between the upper and lower surfaces of the wing and deflectable airfoil.

Figure 9:
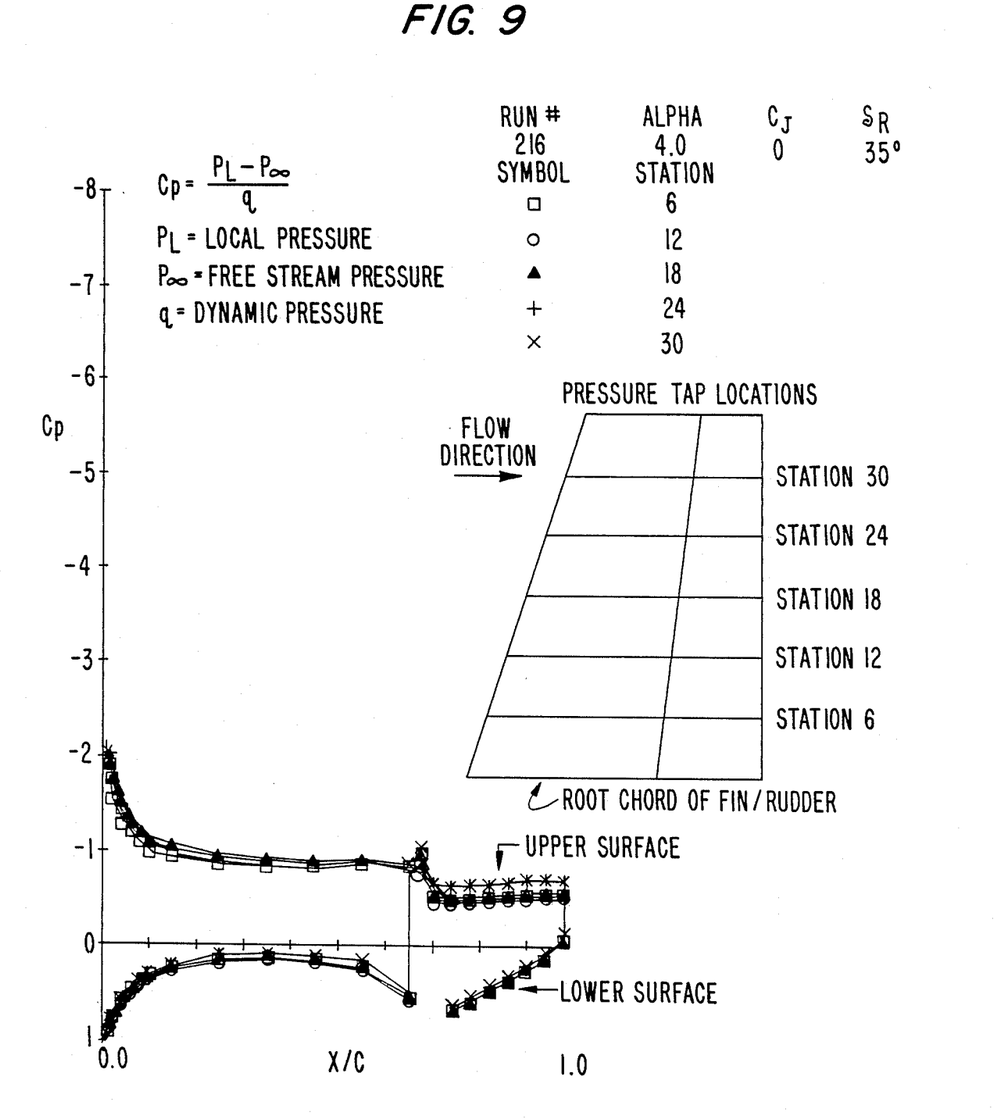
FIG. 9 is a graph illustrating the pressure gradient along a wing and deflectable airfoil with no spanwise blowing.
Figure 10:
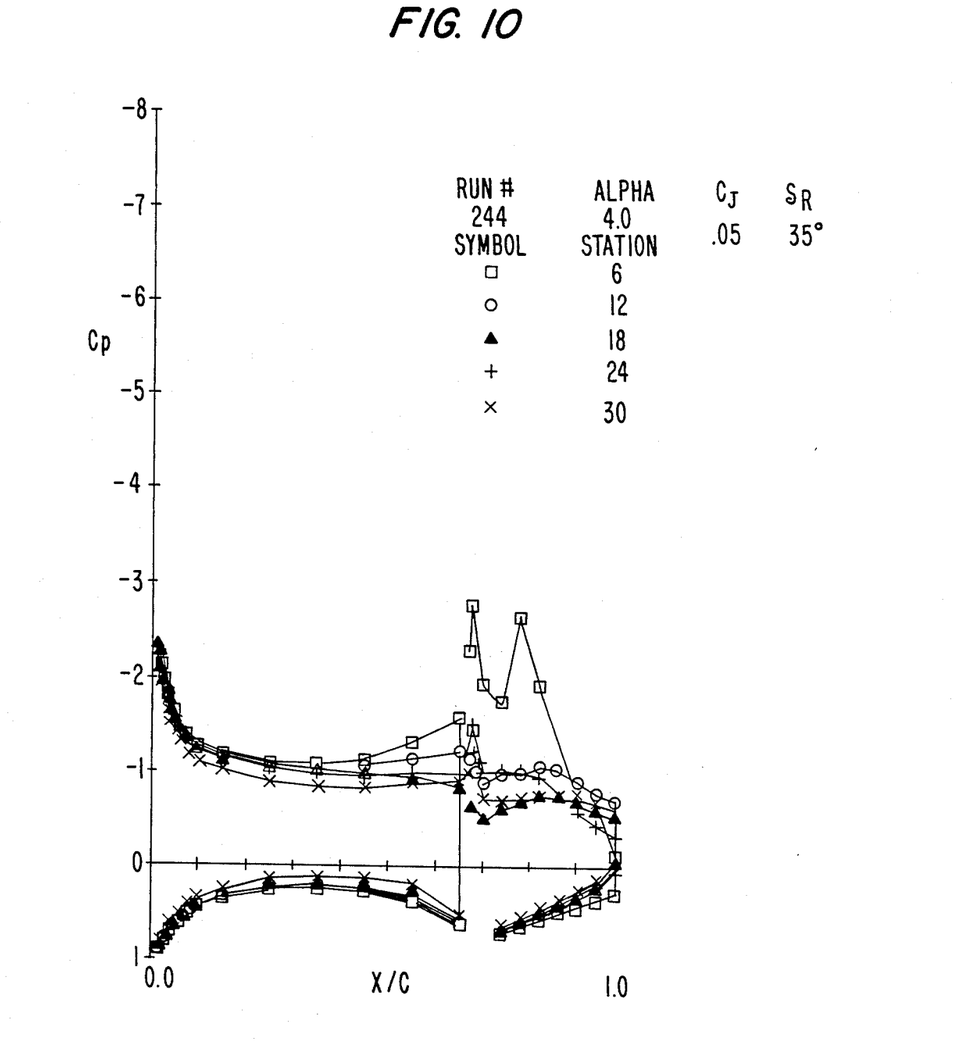
FIG. 10 is a graph illustrating the pressure gradient along a wing and deflectable airfoil having an attached nozzle for spanwise blowing in accordance with the present invention.

This increase in pressure differential between upper and lower surfaces of a wing and deflected airfoil incorporating the teachings of the present invention is illustrated in the graphical representation of FIGS. 9 and 10. FIG. 9 shows wind tunnel pressure data for a wing and deflected airfoil with no spanwise blowing at a 35 degree angle of deflection, and a 4 degree angle of attack. The data provided shows pressure coefficient (Cp) versus the non-dimensional pressure tap location x/c along the local chord of the wing; wherein c equals the local mean chord of the fin/rudder or deflectable airfoil, and x equals the distance of the pressure tap along the local chord. The area between the upper and lower surface Cp curves represents the lift being produced by the wing and airfoil.

FIG. 10 illustrates the same wing and deflected airfoil with spanwise blowing according to the present invention. Note the increase in negative Cp along the wing and deflected airfoil. This indicates an increase in the difference between the pressure on the upper and lower surfaces of the wing and deflectable airfoil which corresponds to an increase in lift.

It is also noted that the deflected airfoil pressure taps are located from about 70% to 100% x/c. The pressure data on the upper surface of the deflected airfoil is mostly constant for the no blowing case indicating separated flow. Spanwise blowing according to the present invention as shown in FIG. 10 causes a reattachment of the deflected airfoil separated flow as is airfoil.

Additional advantages and modifications will readily occur evidenced by the changing pressure distribution on the deflected to those skilled in the art. The invention in its broader aspects is, therefore, not limited to the specific details, representative apparatus and illustrative examples shown and described. Accordingly, departures may be made from such details without departing from the spirit or scope of the applicants' general inventive concept as defined by the appended claims and their equivalents.

What is claimed is:

1. A lift enhancing system for an aircraft having wings and at least one deflectable airfoil attached to the trailing edge of each wing, comprising:
   nozzle means connected to and movable with said deflectable airfoil for directing fluid at a predetermined volumetric flow rate spanwise along at least one surface of said deflectable airfoil to reduce the separated flow area behind the deflectable airfoil of air moving chordwise across said at least one surface to thereby enhance the lifting capability of said wing and deflectable airfoil;
   means for supplying fluid to said nozzle means to effect said volumetric flow rate.

2. A lift enhancing system for an aircraft having wings and at least one deflectable airfoil attached to the trailing edge of each wing, said airfoil having an upper and lower surface, comprising:
   nozzle means connected to and movable with said deflectable airfoil for directing fluid at a predetermined volumetric flow rate spanwise along said upper and lower surfaces of said deflectable airfoil to reduce the separated flow area behind the deflectable airfoil of air moving chordwise across said upper and lower surfaces to thereby enhance the lifting capability of said wing and deflectable airfoil;
   means for supplying fluid to said nozzle means to effect said volumetric flow rate.

3. The lift enhancing system of claims 1 or 2, wherein said nozzle means includes an exit port configured to direct fluid at a predetermined tilt angle with respect to the leading edge of said airfoil.

4. The lift enhancing system of claims 1 or 2, wherein said nozzle means includes means for imparting a swirling flow to the fluid being directed therefrom.

5. The lift enhancing system of claims 1 or 2, wherein the aircraft includes an engine having a source of compressed air, and said supplying means includes means for flow connecting said nozzle means and said source of compressed air, and means for regulating the flow of air through said connecting means.

* * * * *

UNITED STATES PATENT AND TRADEMARK OFFICE
CERTIFICATE OF CORRECTION

PATENT NO. : 4,860,976
DATED : August 29, 1989
INVENTOR(S) : RUSSELL E. MCFADDEN and CHARLES E. SHURE III It is certified that error appears in the above-identified patent and that said Letters Patent is hereby corrected as shown below:

IN THE SPECIFICATION:

Column 1, line 68, change "direct" to --directs--.

Column 5, line 11, change "presents" to --represents--.
          line 36, change "vorticity" to --velocity--;
          line 37, change "velocity" to --vorticity--.

Column 6, line 12, after "is" insert --evidenced by the changing pressure distribution on the deflected--; and line 14, delete "evidenced by the changing pressure distribution"; and

UNITED STATES PATENT AND TRADEMARK OFFICE
CERTIFICATE OF CORRECTION

PATENT NO. : 4,860,976
DATED : August 29, 1989
INVENTOR(S) : Russell E. McFadden et al It is certified that error appears in the above-identified patent and that said Letters Patent is hereby corrected as shown below:

line 15, delete "on the deflected".

Signed and Sealed this

Eleventh Day of September, 1990

Attest:

HARRY F. MANBECK, JR.

*Attesting Officer*     *Commissioner of Patents and Trademarks*